C. B. COTTRELL.

Improvement in Printing Presses.

No. 4,974. Reissued July 16, 1872.

Witnesses:

A Bennevendorf.

Francis M. Cadle.

Inventor:

C. B. Cottrell.

PER

Attorneys.

UNITED STATES PATENT OFFICE.

CALVERT B. COTTRELL, OF WESTERLY, RHODE ISLAND.

IMPROVEMENT IN PRINTING-PRESSES.

Specification forming part of Letters Patent No. 120,041, dated October 17, 1871; reissue No. 4,974, dated July 16, 1872.

Specification describing a new and useful Improvement in Printing-Presses, invented by CALVERT B. COTTRELL, of Westerly, in the county of Washington and State of Rhode Island.

My invention relates to improvements in that class of presses in which the reciprocating table is arrested by an air-spring; and it consists in having the air-spring apparatus arranged for automatically increasing the quantity of air acted upon as the speed of the machine increases, and greater pressure is required to arrest the table, and diminishing the said quantity as the machine slows, so that the movements of the table will be equal, whether running fast or slow, and the action of the machine will be more uniform in other respects.

Figure 1:
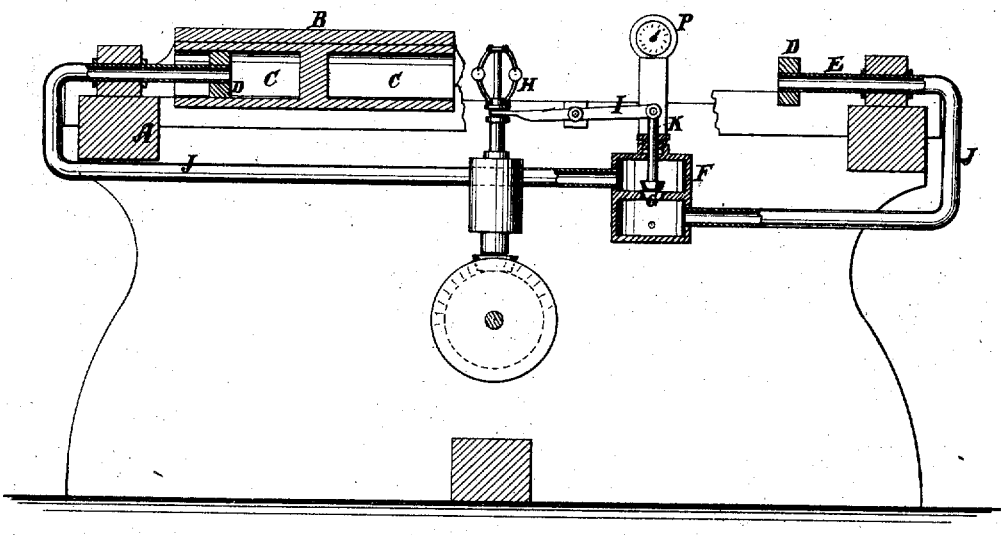
Figure 2:
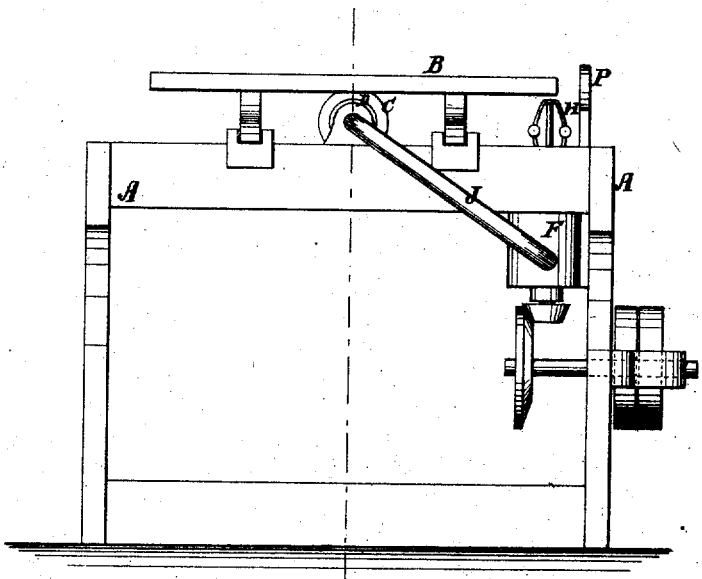

Figure 1 is a longitudinal sectional elevation of a part of a printing-press, showing the application of my improvement; and Fig. 2 is an end elevation.

Similar letters of reference indicate corresponding parts.

A is the frame of the machine. B is the table, whose movements are to be arrested by an air spring, for which it is provided at each end with a cylinder, C, open at one end, in which a piston, D, is received just previous to the end of the movement, and the air behind the piston compressed to form the spring. The pistons are supported on rods E projecting from the frame. These are the devices commonly employed for compressing air to arrest the motion of the table.

It will be observed, in such arrangements, the quantity of air acted upon to form the spring will be always the same, whether the momentum of the table be much or little, and that when the machine is running rapidly, and greater pressure is required to stop the table than when running slowly, the given quantity of air must be compressed more; consequently the table must either move further before being arrested than when running slowly, or it will be finally stopped by some of the working parts or gearing, greatly injuring them. Now, this variation in the action of the table very greatly interferes with the proper action of some parts of the machine, especially the "shoe" on the reciprocating end of the rack, and it is highly desirable to avoid it. I have therefore conceived the idea of varying the quantity of air acted upon according to the speed of the table, which I do by allowing a considerable quantity of air behind the piston to escape when running slowly, and thus have the pistons act upon a smaller quantity, which, being properly regulated according to the speed of the table, admits of always having the table stop at the same point.

To this end I make tubular connections of the cylinder C by means of tube J, or any equivalent thereof, with a drum-cylinder or other suitable place, F, for a check-valve, G, to be opened, more or less, to let the air escape; and for varying the speed of the valve I employ a speed-governor or regulator, H, such as is commonly employed upon steam-engines for regulating the throttle-valves, gearing the said governor with some parts of the machine so that its speed will be governed by the speed of the machine, and arranging it with the said valve so that as the speed increases, and the balls rise or swing away from the axis, the valve will be closed, as clearly shown in the drawing, the valve being connected to the lever I by the stem K, and the lever being raised by the balls as the speed increases, moving the valve down, closing it and shutting off the escape for the air.

I propose to connect a pressure-gauge, P, with the cylinder F, or any other suitable part, to indicate the compression of the air, and show the variations thereof due to different speeds, and to facilitate the adjustment of the air-spring regulating-valve to secure the right pressure for any given speed, which can be readily done with great accuracy by the aid of said gauge, after the necessary pressures to stop the table at the right point under the different speeds it is required to run have been ascertained by tests, or otherwise, and noted.

It will also be observed that the governor will always open this valve on the stopping of the machine, so that the air will be allowed to escape from the pistons, and the air-spring will not be operative when starting the machine, or moving it by hand, and thus avoid the necessity of compressing the air when the driving-belt has but little adhesion to the pulley, or when the table is moved by hand, as is sometimes required; and said governor will close the valve sufficiently to restore the spring when the press sets in motion again, and the balls of the governor come to their position in the running machine. This automatic opening of the passage to the cylinders behind the pistons saves the necessity of opening it by hand, as it has been heretofore necessary to do whenever it was required to turn the press by hand, to remove waste sheets on the rollers, or for cleaning or repairs, it being difficult to turn it when the air is compressed behind the pistons, but which is thus prevented by an open passage to the space behind the piston. It also saves the closing of the valve by hand at the starting of the press.

Having thus described my invention, I claim as new and desire to secure by Letters Patent—

1. The air-compressing devices employed in printing-presses for compressing air to arrest the table when arranged for allowing some of the air to escape, and said escape controlled by an automatic regulator, substantially as specified.

2. The combination with the air-spring mechanism of a printing-press, of a valve and apparatus which automatically opens said valve when the machine stops and destroys the spring, and closes said valve and restores the spring when the press sets in motion, as described.

CALVERT B. COTTRELL.

Witnesses:
ANSON P. THAYER,
W. A. GRAHAM.